United States Patent [19]

Johansson

[11] Patent Number: 5,009,684
[45] Date of Patent: Apr. 23, 1991

[54] MULTIPLE CYCLONE SEPARATOR

[76] Inventor: Ernst Johansson, 6, Björnåkersgatan, S-937 00 Burträsk, Sweden

[21] Appl. No.: 378,184
[22] PCT Filed: Dec. 22, 1987
[86] PCT No.: PCT/SE87/00627
 § 371 Date: Jun. 26, 1989
 § 102(e) Date: Jun. 26, 1989
[87] PCT Pub. No.: WO88/04953
 PCT Pub. Date: Jul. 14, 1988

[30] Foreign Application Priority Data

Dec. 22, 1986 [SE] Sweden ................................ 8605590

[51] Int. Cl.$^5$ ............................................. B01D 45/12
[52] U.S. Cl. .......................................... 55/340; 55/344;
 55/347; 55/348; 55/349; 55/447
[58] Field of Search .................. 55/210, 218, 340, 344,
 55/347–349, 410, 418, 447

[56] References Cited

U.S. PATENT DOCUMENTS

| 2,119,478 | 5/1938 | Whiton, Jr. | 55/349 X |
|---|---|---|---|
| 2,209,339 | 7/1940 | Knight | 55/349 X |
| 2,696,895 | 12/1954 | Phyl | 55/348 |
| 2,731,102 | 1/1956 | James | 55/348 X |
| 2,776,725 | 1/1957 | Wood | 55/218 X |
| 2,806,551 | 9/1957 | Heinrich | 55/340 |
| 2,963,109 | 12/1960 | Brookman et al. | 55/349 X |
| 3,236,031 | 2/1966 | Bennett et al. | 55/349 X |
| 3,448,563 | 6/1969 | Sobeck | 55/348 X |
| 3,469,566 | 9/1969 | Wilkinson et al. | 55/348 X |
| 3,520,114 | 7/1970 | Pall et al. | 55/348 X |
| 3,668,825 | 6/1972 | McIlvaine | 55/410 X |
| 3,707,830 | 1/1973 | Gustavsson | 55/410 |
| 3,825,212 | 7/1974 | Darges et al. | 55/348 X |
| 3,915,679 | 10/1975 | Roach et al. | 55/348 X |
| 4,050,913 | 9/1977 | Roach | 55/347 X |
| 4,242,115 | 12/1980 | Harold et al. | 55/347 |
| 4,289,611 | 9/1981 | Brockmann | 55/348 X |
| 4,407,663 | 10/1983 | Hawley | 55/348 X |
| 4,473,326 | 9/1984 | Oetiker | 55/210 X |

FOREIGN PATENT DOCUMENTS 304668 9/1968 Sweden .
701593 12/1953 United Kingdom .

OTHER PUBLICATIONS

Derwent's abstract No. 55754 B/30 SU 626 809.

Primary Examiner—Robert Spitzer
Attorney, Agent, or Firm—Cushman, Darby & Cushman

[57] ABSTRACT

A purification unit for separation of solid particles from gases comprises at least one group of a plurality of flow cylinders arranged in a common chamber. Each flow cylinder has a fixed rotary head for setting incoming gas in rotary motion, an outlet diffuser for purified gas projecting concentrically into the outlet end of each flow cylinder and forming together with the surrounding cylinder an annular gap with its inlet portion. Through this gap, separated particles stream out to the chamber. In order to obtain at least the same purifying effect with several dust separators connected in parallel and each including a flow cylinder with a fixed rotary head and outlet diffusor as with one single dust separator, the common dust collecting chamber is connected by way of at least one suction line to a steplessly adjustable blower in order to maintain a negative pressure in the chamber optimizing the purification.

7 Claims, 2 Drawing Sheets

MULTIPLE CYCLONE SEPARATOR

Background of the Invention

This invention relates to a purification unit for separating solid particles from gases, for example: flue gases, air mixed with dust and, air-blast such a unit includes one or more groups, each having a plurality of mutually parallel flow cylinders arranged in a common chamber, each cylinder being connected at its inlet end to a fixed rotary head for setting incoming gas in rotary motion in the respective flow cylinder and, an outlet diffusor projecting concentrically into the outlet end of each such cylinder. In use, purified gas streams out through the outlet diffusor. The outlet diffusor forms, with its inlet portion enclosed by the flow cylinder, and annular gap together with the surrounding cylinder. In use, separated solid particles stream out through the annular gap to the closed chamber serving for dust collection.

Dust separators comprising one single flow cylinder with associated rotation generator connected to the inlet end of the cylinder and having an outlet diffusor projecting concentrically into the outlet end of the flow cylinder have been previously known. This type of dust separator has appeared to operate very satisfactorily, as far as flue gases and other gases containing particles of a small mass are concerned, and purifies such gases up to about 99.7%. This is quite acceptable in most connections that may be concerned with the present type of dust separator. However, a disadvantage of this known dust separator is a very low capacity, i.e. below 600 m$^3$ gas per hour, and therefore it has not been used to any large extent, despite its high efficiency in purification.

In order to improve the capacity, several such dust separators have been connected in parallel by arranging the flow pipes of all of these dust separators in a common closed dust collecting chamber in which the gap of the dust separators between flow cylinder and outlet diffusor ends provides for discharge of separate particles in the collecting chamber. An example of such a dust separating unit is shown in Swedish laid-open publication No. 304 668. Thus, parallel connection of a plurality of dust separators to one unit has been tested in practice but no better purification degree than about 86%, i.e. a purification degree that is too low to be considered acceptable in most connections, has been obtained. Therefore, purification units containing several dust separators connected in parallel of this type have not been used in practice.

After establishing that purification units containing several dust separators connected in parallel of the type indicated above do not give the desired purification effect, attempts have been made to solve this problem, but without any appreciable success so far.

SUMMARY OF THE INVENTION

The foregoing problem is solved by the present invention, the result of which is a purification unit consisting of one of several dust separating units having an efficiency of the purification that corresponds to, and is even somewhat better than the efficiency obtained by means of one single dust separator of the relative type, and this is independent of which kind of impurified gas is to be purified. By means of the unit of the invention even air-blast can be purified for re-use of the blast agent.

BRIEF DESCRIPTION OF THE DRAWINGS

The invention is described in the following in greater detail with reference to the accompanying drawings, wherein.

In the drawings

DETAILED DESCRIPTION

Figure 1:
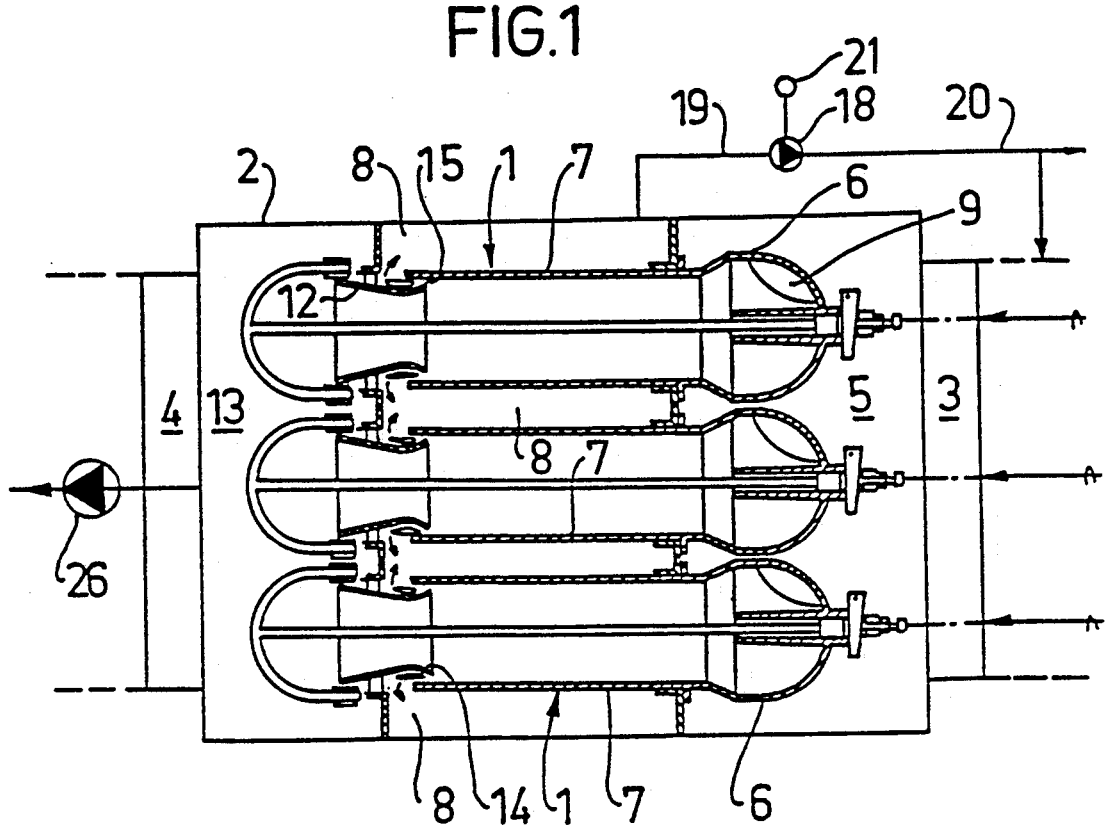
FIG. 1 shows a section of a purification unit according to the invention.

The purification unit of the invention for separation of dust and other solid particles from impurified gases inclusive of air comprises a plurality of similar dust separating units 1 of cyclone type, which are arranged in rows in a casing 2 having an inlet 3 for the gas or gases to be purified and an outlet 4 for the gas or gases purified. Each dust separator 1 included in the unit comprises a fixed rotary head 6 located in an inlet chamber 5 for setting incoming gas in rotation, preferably a helical rotary motion, and a flow cylinder 7 connected to the rotary head 6 and arranged in a closed dust collecting chamber 8 common to all the flow cylinders 7 of the dust separators included in the unit. This chamber is quite separated from the inlet chamber 5 which is common to all units 1, and a collecting container (not shown in the drawings) can be connected to the dust collecting chamber 8. Gas intended for purification arrives at the chamber 5 via the inlet 3 and a helical rotary motion is imparted to the gas by the rotary heads 6 through the following flow cylinders 7, dust and other solid particles accompanying incoming gas being concentrated, due to their inertia, i.e. through the action of centrifugal force, along the inside of the respective flow cylinder 7.

Figure 6:
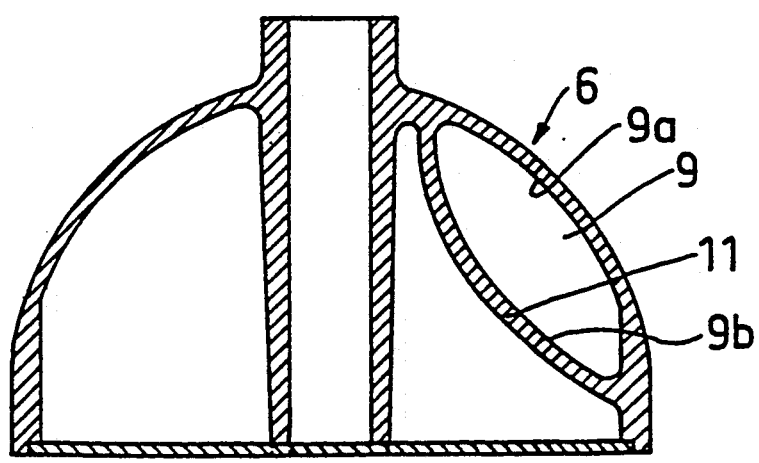
FIG. 6 shows a section taken substantially along the line VI—VI in FIG. 5.

The rotary head 6 of each dust separating unit has a dome- or cup-shaped mantle having an inside diameter which is larger than the following cylinder 7 and is provided in its mantle with a plurality of, for example five, uniformly distributed, inlet openings 9 located substantially in a radial plane and hollows or recesses 10 in the mantle surface leading to the respective opening 9. The width and depth of the recesses increase towards the respective opening and have a concave curved form in cross-section, as is best apparent from FIGS. 3 and 6. Each portion 11 of the mantle defines a hollow or recess 10 functioning as guide blades for setting incoming gas in rotary motion. Each inlet opening 9 in a rotary head 6 has its upper limiting line 9a so located that it borders on, or preferably overlaps the lower limiting line 9b of the opening.

At the outlet end of each flow cylinder, there is arranged an outlet diffusor 12 ending in an outlet chamber 13 for the purified gas streaming out of the units 1. The outlet chamber is quite separated from the dust collecting chamber 8. Each outlet diffusor 12 extends concentrically into its flow cylinder 7 with a funnel-shaped inlet portion 14 and forms, together with the end section of the flow cylinder, an annular gap 15 ending in the closed dust collecting chamber 8.

Impurified gas entering through the inlet 3 of the unit is distributed to the several dust separating units 1 and is set in rotation by the rotary heads 6 of the respective units, and the helically rotating gas stream in each flow cylinder 7 continues through the cylinder 7. The particles included in the gas are thrown by the influence of the centrifugal force against the cylinder wall and form a rotating dust film. When the gas stream reaches the outlet diffusor 12, the portion thereof streaming out of the diffusor is purified, while the remaining portion of the gas stream, i.e. the portion containing the dust film and rotating close to the cylinder wall continues in a rotating way into and out through the diffusor gap 15 to the collecting chamber 8 where the particles fall down by the influence of gravity and are preferably collected in a container.

Figure 2:
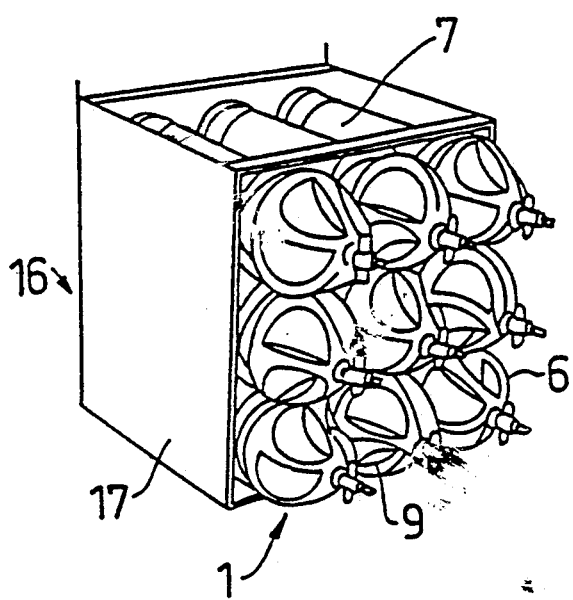
FIGS. 2 and 3 are perspective views on a smaller scale of a module or group of nine and three, respectively, dust separating units connected in parallel.
Figure 3:
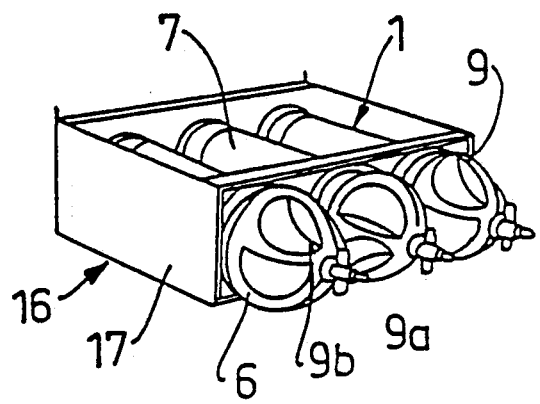

The number of dust separators 1 included in a unit according to the invention is adapted with respect to the amount of gas to be purified per unit of time. In order to make this adaptation easier, the separating portion or portions of the unit can be composed of cassettes or modules 16 each comprising a suitable number, for example 1, 2-8 or 9, of dust separating units 1 enclosed in a casing 17 with at least one open side. The units are easy to join and connect to a collecting container of a suitable size. Examples of two such modules 16 are shown in FIGS. 2 and 3 containing nine and three, respectively, units 1.

A steplessly adjustable blower 18 is connected to the dust collecting chamber 8 of the unit and is associated with the chamber 8 through one or several suction lines 19 depending on, i.a., the number of dust separating units 1 belonging to the chamber 8 for maintaining a negative pressure within the chamber 8. Each suction line 19 should be connected to the dust collecting chamber 8 spaced from the diffusor gaps 15 and preferably as remotely from these as possible. One or several of the suction lines 19 can also extend into the chamber 8 between the units 1 and have their inlet opening located at some distance from the walls of the casing. The blower 18 is connected with its pressure line 20 to the channel leading to the unit before the inlet 3 of the unit or to another space, for example the atmosphere or the chamber, the air of which is purified. This is possible due to the fact that the return flow caused by the blower 18 is such a small portion of the total main flow through the unit which is less than 0.1% and maximally 3% and is almost purified.

For the stepless adjustment of the blower 18, there is arranged an operating or steering means 21, by means of which the negative pressure in the dust collecting chamber 8 can be changed steplessly within wide limits. An equalization of the differential pressure between the flow cylinders ending in the dust collecting chamber 8 with its column in the area around the gap 15 thereof is achieved. The result of this equalization being that the flow cylinders 7 do not disturb each other, but operate as separate units, i.e. as if they were alone and quite separated from each other. In this way, several dust separating units connected in parallel are obtained which contain purification means capable of purifying impurified gases at least as effectively as a plant containing one single dust separator 1 of the relative type and thus to at least 99.7%. Due to this possibility of adjusting the negative pressure in the dust collecting chamber 8 steplessly, it is also possible to control, i.e. increase or reduce, the flow rate through the diffusor gaps 15, and in this way the purification unit of this invention also enables one to provide an optimal purification of impurified gases independently of the size and mass of the particles forming the impurities. The purification unit of the invention can, for instance, be used for recovery of blast agents from air blast which has not been possible by means of known purification units of this type. This is due to the possibility of achieving a high current rate through the diffusor gaps 15, and, in this way, each tendency to a braking accumulation of particles in front of the diffusor gaps within the flow cylinders 7 is eliminated. As a result, particles may be sucked along with the purified gas through the diffusors 12, the consequence being an impaired purification. A high flow rate through the diffusor gaps 15 gives a higher rotation speed for the gas within the flow cylinders 7 and consequently also a more efficient concentration of heavy particles.

Figure 4:
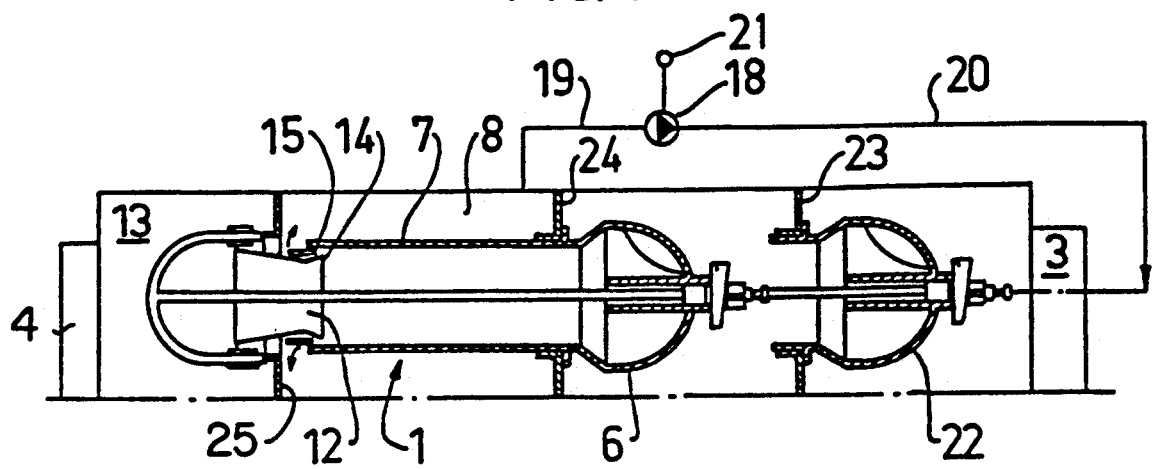
FIG. 4 shows a modified design with a rotary head mounted before each dust separating unit.
Figure 5:
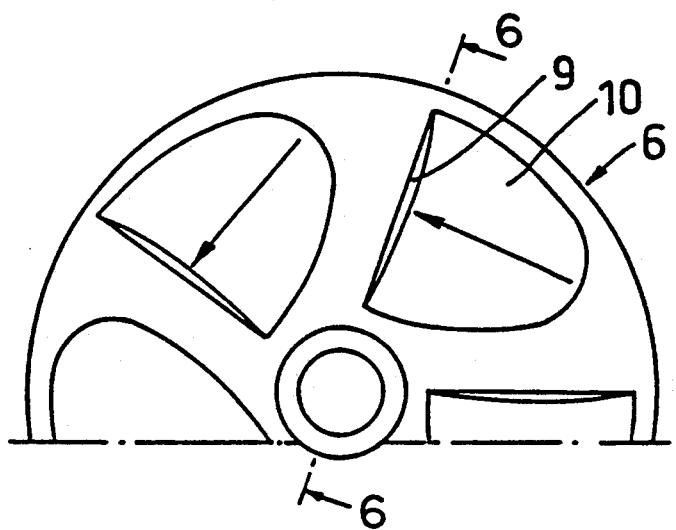
FIG. 5 is a partial end view of a rotary head.

As shown in FIG. 4, in order to further increase the rotary speed within the flow cylinders 7 there may be arranged another rotary head 22 of the same type as the rotary head 6 of the dust separating units in front of each dust separating unit 1 and coaxially with its rotary head 6. These are attached in a wall 23 between the inlet 3 of the unit and the wall 24 supporting the dust separating units 1. A first purification of the gas takes place in the space between these two walls. In that space, the heaviest particles are separated from the gas due to the rotary motion in which the impurified gas is set by the further rotary head 22. The rotary speed of this gas is thereafter increased by the rotary head 6 of the respective dust separating unit, resulting in a very efficient purification in the second step, i.e. in the flow cylinders 7, and the diffusor gaps 15 thereof ending in the chamber 8. The chamber 8 is defined by the walls 24 and 25, the latter of which is the partition between the chamber 8 and the outlet chamber 13.

The flow through this purification unit is determined by a main blower 26 which can be arranged either before the inlet 3 of the unit or after its outlet 4. This latter location of the main blower is shown in FIG. 1. The present invention is not restricted to what has been described above and shown in the drawings, but it can be changed and modified in several different manners within the scope of the inventive concept defined in the appended claims. Thus, the alternative with one dust separating unit 1 and a rotary head mounted before this unit arranged as a purification unit with blower to obtain a negative pressure in the dust collecting chamber is included in the inventive concept.

For automatic control of the purification unit in dependence on the amount of impurities in gas streaming out through the outlet 4, a detecting means connected to the operating or control means of the blower can be arranged in the outlet 4. The means detecting the amount of impurities in the gas streaming out through the outlet and, in case this amount will increase over a predetermined value, actuates the control means of the blower to adjust the blower until the predetermined value is reached again.

I claim:

1. A purification unit for separating solid particles from a gas stream, comprising:
   wall means defining a common chamber having an inlet for a gas stream to be purified, and an outlet for a purified gas stream;
   wall means defining a common chamber having an inlet for a gas stream to be purified, and an outlet for a purified gas stream;
   at least one flow cylinder unit disposed in said common chamber;

each flow cylinder unit comprising a plurality of flow cylinders having mutually parallel longitudinal axes;

each flow cylinder having an inlet end provided with a stationary head provided with opening means configured to accept a portion of the gas stream entering the common chamber through said inlet to said common chamber and set such portion into rotary motion relative to the longitudinal axis of the respective flow cylinder;

each flow cylinder further having an outlet end having a tubular outlet diffuser having an inlet end telescopically coaxially received therein with spacing therebetween defining an annular gap out through which solid particles separated from the gas stream portion in the respective said flow cylinder may flow into common chamber;

each said outlet diffuser further having an outlet end, out through which the respective gas stream portion, cleansed of said solid particles, flows out of the respective flow cylinder and out of said outlet of said common chamber;

said wall means defining said common chamber further including wall means isolating said inlet end of each flow cylinder and said outlet end of each flow cylinder, from said annular gap of each flow cylinder and thereby defining within said common chamber a closed dust collection chamber;

a steplessly adjustable blower having a suction side and a pressure side; and suction conduit means operatively connecting the suction side of said blower with said dust collection chamber for maintaining a negative pressure within said dust collection chamber for enhancing separation of said solid particles from said gas stream.

2. The purification unit of claim 1, further including:

pressure conduit means operatively connecting the pressure side of said blower with said inlet end of at least one said flow cylinder.

3. The purification unit of claim 1, further including:

pressure conduit means operatively connecting the pressure side of said blower with the atmosphere externally of said purification unit.

4. The purification unit of claim 1, wherein:

said isolating wall means define two opposite ends of said dust collecting chamber; said suction conduit means and said annular gaps respectively communicating with said chamber adjacent mutually opposite ends of said dust collecting chamber.

5. The purification unit of claim 1, further including:

a plurality of additional rotary heads disposed in said common chamber, each being arranged upstream of the respective stationary head of a respective said flow cylinder and arranged for causing a respective portion of said gas stream to be set in rotary motion generally about the longitudinal axis of a respective said flow cylinder before entering such flow cylinder through the respective stationary head.

6. The purification unit of claim 5, wherein:

each said additional rotary head has an inlet and an outlet, each additional rotary head outlet being spaced upstream in said common chamber of a respective stationary head; and said wall means further includes further isolating wall means isolating said inlets of said additional rotary heads from said outlets of said rotary heads, whereby said additional rotary heads empty into a common closed space in said common chamber, into which said stationary heads of said flow cylinders open, providing an additional space for collecting solid particles separating from said gas stream.

7. The purification unit of claim 1, wherein:

said steplessly adjustable blower is provided with a capacity such that gas stream mass flow through said blower is in the range of 0.1 to 3.0 percent of gas stream mass flow through said flow cylinders.

* * * * *